(12) United States Patent
Esch et al.

(10) Patent No.: US 8,271,708 B2
(45) Date of Patent: Sep. 18, 2012

(54) METHOD AND DEVICE ADAPTED FOR PERFORMING SINGLE-CHANNEL BUS COUPLING OF A SAFETY-CRITICAL PROCESS

(75) Inventors: Rainer Esch, Blomberg (DE); Steffen Horn, Blomberg (DE); Johannes Kalhoff, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 477 days.

(21) Appl. No.: 12/278,229

(22) PCT Filed: Feb. 15, 2007

(86) PCT No.: PCT/EP2007/001337
§ 371 (c)(1),
(2), (4) Date: Mar. 30, 2010

(87) PCT Pub. No.: WO2007/093427
PCT Pub. Date: Aug. 23, 2007

(65) Prior Publication Data
US 2010/0217408 A1     Aug. 26, 2010

(30) Foreign Application Priority Data
Feb. 17, 2006   (DE) .......................... 10 2006 007 844

(51) Int. Cl.
*G06F 13/42* (2006.01)
(52) U.S. Cl. ...................................... 710/105
(58) Field of Classification Search .......... 710/104–110, 710/28, 58–61, 72–73, 62–64; 714/4, 12, 714/48; 700/21, 79
See application file for complete search history.

(56) References Cited

U.S. PATENT DOCUMENTS

| | | | | |
|---|---|---|---|---|
| 6,161,202 A | * | 12/2000 | Kuntzsch et al. | 714/51 |
| 6,725,419 B1 | * | 4/2004 | Barthel et al. | 714/807 |
| 6,915,444 B2 | * | 7/2005 | Vasko et al. | 714/4.4 |

(Continued)

FOREIGN PATENT DOCUMENTS

DE        195 32 639 A1     2/1997

(Continued)

OTHER PUBLICATIONS

PCT International Search Report and Written Opinion, dated May 4, 2007.

(Continued)

*Primary Examiner* — Raymond Phan
(74) *Attorney, Agent, or Firm* — Kaplan Breyer Schwarz & Ottesen LLP

(57) ABSTRACT

Method and device in which a data set that is relevant for a safety-critical process is processed by at least two redundant processing channels according to identical laws for each safe protocol and the redundant safe protocols are assembled into a common safe protocol, in that each processing channels accesses a common buffer register. For each register location, a write authorization is allocated only once such that the common safe protocol is assembled proportionally by writing different portions of the corresponding safe protocols. The contents of each register location of the buffer register is read before the transfer of the common safe protocol from the buffer register for verification of the safe protocol formed in common from each of the redundant processing channels. The safe protocol formed in common is released only as a reaction to a release for transmission by each redundant processing channel.

11 Claims, 5 Drawing Sheets

U.S. PATENT DOCUMENTS

| | | | |
|---|---|---|---|
| 6,999,824 B2 * | 2/2006 | Glanzer et al. | 700/18 |
| 7,945,818 B2 * | 5/2011 | Oster et al. | 714/48 |
| 2003/0051203 A1 * | 3/2003 | Vasko et al. | 714/781 |
| 2006/0087967 A1 * | 4/2006 | Landwehr et al. | 370/228 |

FOREIGN PATENT DOCUMENTS

| | | |
|---|---|---|
| DE | 100 65 907 A1 | 9/2002 |
| DE | 10 2004 039 932 A1 | 3/2006 |

OTHER PUBLICATIONS

Y. Cussac, "International application No. PCT/EP2007/001337 International Report on Patentability", Oct. 14, 2008, Publisher: PCT.

"German Office Action for German International Application No. 10 2006 007 844.6-53", Dated: Apr. 19, 2007, Publisher: German Patent Office, Published in: DE.

* cited by examiner

METHOD AND DEVICE ADAPTED FOR PERFORMING SINGLE-CHANNEL BUS COUPLING OF A SAFETY-CRITICAL PROCESS

FIELD OF THE INVENTION

The invention relates to a method and also to a device adapted for performing the method for the single-channel bus coupling of safety-relevant processes.

BACKGROUND OF THE INVENTION

Below, a safety-relevant process is understood to be a process that does not generate a more than negligible risk to people and/or material goods if an error occurs. Therefore, in a safety-relevant process, in the ideal case, 100-percent safety must be guaranteed, such that, if an error occurs in this process, a subsequent process coupled with this process and/or an overall system including this process is brought into a state of safety. Thus, such safety-relevant processes may also be sub-processes of larger, higher-level overall processes. Examples of safety-relevant processes are chemical processes in which critical parameters must absolutely be kept within a given range, complex machine controllers, such as, for example, in a hydraulic press or a production line, in which, for example, the start-up of a pressing/cutting tool can represent a safety-relevant sub-process. Additional examples for safety-relevant (sub) processes are the monitoring of protective screens, protective doors, or light barriers, the control of two-hand switches, or also the reaction to an emergency cut-off switch.

Thus, for all safety-relevant processes, it is absolutely necessary that the associated safety-relevant data that is generated, detected, or measured is transported in real time without any corruption, because any corruption could result in an incorrect function and/or reaction that could ultimately endanger the life and health of people.

To satisfy safety requirements, in recent years, numerous agreements have been made that require essentially error-free data transport in the use of bus systems. These concern, in particular, the data transport itself and also a permissible residual error probability as a function of each application or each process. Here, appropriate standards include, in particular, EN 61508 and EN 954-1, as well as the principles for testing and certifying "bus systems for the transmission of safety-relevant messages" of testing and certification bodies in the service of occupational health and safety.

According to these agreements and standards, safety-oriented bus systems have been developed that transmit data with a high redundancy. Possible errors are discovered in due time and danger can be avoided. Examples here are, among other things, Safety Bus P, Profibus F, Interbus Safety, etc.

Here, it is disadvantageous, however, that for the use of safety-oriented bus systems, already installed bus systems must be replaced and frequently, restrictions on the number of subscribers, data transport rate, or data protocol must be taken into account.

Consequently, safety-oriented methods and/or components have been developed that allow simpler and more economical retrofitting of already existing bus systems. In particular, electronic safety methods for control and automation technology use (field) bus systems already in use for data communications between the individual units taking part in a process for the transmission of safety-relevant data, in particular, between sensors, actuators, and/or control devices.

EP 1 188 096 B1 discloses, for example, a control system for a safety-relevant process with a field bus, by means of which a control unit for controlling the safety-relevant process and a signal unit, which is linked with the safety-relevant process by means of I/O channels, are connected. To guarantee error-free communication with each other, these units have safety-relevant devices, through which non-safe units are made safe units. In detail, every two or more redundant processing channels are provided such that an error in one of the processing channels can be detected and possibly corrected with reference to a result that deviates from the result of the other redundant processing channel. This multiple-channel structure is realized, in particular, by two redundant processors, wherein the safety analysis ends after the two redundant processors and the analysis of safe data protocol being used starting from this point without additional details.

In the following, the general term of processor should be understood, if not specified in more detail, to be essentially any type of data-processing device, such as microcomputers, microprocessors, microcontrollers, or also PCs.

WO 01/15385 A2 also relates to the control of safety-relevant processes under the use of (field) bus systems, wherein the units taking part in the control of the safety-relevant process usually have, in turn, redundant processing channels. Each of the redundant channels comprises a processor that monitors the other. This multiple-channel structure is transferred via another processor connected to the field bus into a single-channel structure (FIG. 3). More detailed specifications including the transfer of the multiple-channel structure to the single-channel structure are not to be found in the publication.

WO 01/15391 A1 and the Laid-Open Specification DE 199 39 567 A1 are additional examples of safe bus subscribers with redundant processing channels and/or processors mutually controlling each other with respect to a safe protocol design and subsequent transfer from the double-channel structure to the single-channel structure by means of another processor, which is coupled to the bus and which is connected to a protocol chip or which is integrated with this protocol chip. Here, safety analysis also ends after the two redundant processors without the disclosure of additional technical measures and the analysis is used for a safe data protocol after this point.

To reduce the circuitry expense, Patent Specification DE 195 32 639 C2, which concerns a device for the single-channel transmission of data formed by means of two redundant processors, integrates the function of the bus coupling into one of the two redundant processors. Thus, only the processor with the bus-coupling functionality has an output channel, to which useful data originating from this processor and test data originating from the other processor are fed or vice versa or to which useful data and test data of both processors are fed in an interleaved way (FIG. 4). However, to guarantee that the processor that operates the bus is not in the position to generate data packets that cannot affect the other processor, in the conversion an increased effort in safety analysis is necessary, because, for one, the freedom from feedback and, second, the independence of the computer for establishing the safe protocol must be detected. For this purpose, the patent specification merely proposes a corresponding connection or non-connection of the corresponding processor outputs.

DE 100 65 907 A1 further describes a method concerning the principle of "redundancy with cross-check" for safe data transport for data transmission on parallel or serial networks or bus systems, wherein a buffer register is used with two identical logic data areas for the transfer of the double-channel structure to the single-channel structure. The complete safety-oriented message to be transmitted with a single channel via the bus system comprises the data contents of both data areas of the buffer register. Before the buffer register on the side of the transmitter, two redundant processors, in turn, are connected, which prepare safety-relevant data provided with a single channel or double channels according to the type of application, each with redundant information to form safe data and which exchange this data for checking. If both reach the same result, then each of the processors transmits its safe data to the buffer register, wherein each data area is occupied with the safe data of each processor, which, on its side, already contains redundant information for error recognition. In an alternative embodiment, if the buffer register is contained in one of the two processors, so that this one processor consequently assigns both data areas of the buffer register accordingly in agreement with the second processor, this second processor performs another read process for controlling the buffer register with the two data areas. According to the application, the data contents of one of the two data areas of the buffer register can also have inverted data or other additional interleaving, in order to recognize, for example, systemic errors in the transmitters, receivers, and/or other units forwarding the units. A disadvantage here is that, in particular, the total data length of the safety-oriented message is extremely large with respect to the actual usable data and the data transfer rate is thus small with respect to the actual usable data, because for each usable data set to be transmitted, two identical usable data sets and also redundant information for each of the identical usable data sets are to be transmitted. For a decreasing number of usable data units to be transmitted in each data packet, as is given, for example, for the Interbus, the ratio of usable data length to the total data length becomes increasingly worse.

The task of the German Patent Application No. 10 2004 039 932.8 filed on Aug. 17, 2004 by the same applicant as the present invention, wherein the present invention represents a refinement of this patent application, is to provide, for the safe bus coupling of safety-relevant processes, another, novel, and improved way for the transmission of the multiple-channel structure to the single-channel structure and to guarantee, in a way that is easy to realize and especially also in a way that is easy to test, a freedom from feedback and independence in the establishment of a safety-oriented protocol, which is to be transmitted as a safety packet via a bus.

For this purpose, it was proposed to provide a method for the single-channel bus coupling of a safety-critical process, in which a data set that is relevant for the safety-critical process is processed by means of at least two redundant processing channels, in particular, in a protocol-specific way, according to identical laws for each safety-oriented protocol, and the redundant, safety-oriented protocols for single-channel bus coupling are assembled back into a common safety-oriented protocol, in that each of the processing channels accesses a common buffer register, wherein, for each register location, a write authorization is allocated only once, such that the common safety-oriented protocol, that is, the safety packet to be transmitted, is assembled proportionally by writing different portions of each safety-oriented protocol.

Consequently, one significant advantage here is that, first, both processing channels are in the position to calculate the complete safety-oriented protocol, so that this has a positive effect on the necessary packet length, because all of the data bits are already known with the different safety mechanisms in the redundant processing channels and no additional data bits must be transmitted, which permit a determination to be made on the error-free calculation on the receiver side. In addition, it is guaranteed that one processing channel alone is not in the position to transmit a safety packet, wherein the control by means of the write authorization that can be allocated only once for data into a register location represents one possibility that is easy to implement and that is highly efficient, in order to guarantee safety that is significantly increased in an economical way independent of the bus (system) that is used.

Thus, the realization of an intelligent unit for performing the method according to the invention can already be guaranteed by the use of an apparatus with at least two redundant processors, in which the processors for processing an identical input data set are configured under the use of identical laws for each safety-oriented protocol and which are connected by means of a circuit arrangement to a common buffer register in such a way that for each register location of the buffer register, a write access is given for only one of the processors.

The invention according to the German Patent Application No. 10 2004 039 932.8 thus allows, through the use of standard components and independent of each bus system, a highly dynamic and highly efficient solution that is easy to implement for the feedback-free and independent formation of each safety-oriented protocol, wherein the specific processing rules for forming the safety packet are here preferably suitable for satisfying the corresponding safety requirements, in particular, the safety requirements for a simple transmission according to SIL 3 IEC 61508.

Furthermore, the invention according to the German Patent Application No. 10 2004 039 932.8 already provides the construction of the circuit arrangement in a useful way such that each of the processors can read access each register location of the buffer register, so that, according to the preferred construction, before a transmission of the common safety-oriented protocol from the buffer register for transmission, each register location is read accessed by each of the redundant processing channels, in order to perform a verification of the safety-oriented protocol formed in common. Here, due to the possible additional comparison of the safety-oriented protocol formed in common with each safety-oriented protocol formed separately or individually by means of the processing channels, the achieved degree of safety may also be increased significantly again, because for the loss of or an error in a processor, a complete safety packet cannot be generated, so that an error is definitely identified and a safety-oriented function can be initiated.

SUMMARY OF THE INVENTION

However, it has been shown that, in the case of an error, the safety-oriented protocol formed in common is possibly already transmitted from the buffer register for further processing, even though the verification of the read protocol has not yet been completed.

Now, one task of the present invention is to refine the subject matter of German Patent Application 10 2004 039 932.8 in such a way that in the read process for verifying the safety-oriented protocol written in common into the buffer register, the transmission of this common safety-oriented protocol from the buffer register is ruled out as long as the verification is not completely finished.

The solution according to the invention is already given in a very surprising way by an object with the features of one of the pending independent claims.

Advantageous and/or preferred embodiments and refinements are the subject matter of each dependent claim.

Thus, according to the invention it is provided that, in reading the safety-oriented protocol written in common into the buffer register for its verification, this safe or safety-oriented protocol formed in common and written into the buffer register is released only as a reaction to a release by each of the redundant processing channels for the transfer or transmission from the buffer register for further processing.

For this purpose, if the device comprising at least two redundant processors is constructed in such a way that for a read access possibility at any register location of the buffer register for each of the processors, the processors have means for verifying the contents read from the buffer register and for releasing the contents of the buffer register as a response to a positive verification result, then such a release can be realized in a simple and economical way through the transmission of corresponding release signals to the buffer register.

In order to allow or release access to the buffer register contents for their transfer or transmission for further processing only in the presence of a release by each of the redundant processing channels, e.g., the activation of a release signal or enable signal releasing the output of the contents can be implemented by means of AND gating the individual release signals.

In another preferred construction, it is further provided that each of the redundant, safe protocols is built from a number of protocol parts corresponding to the number of redundant processing channels, and the write authorizations are allocated in such a way that for assembling the common safe protocol from each processing channel, a different protocol part is written into the buffer register.

In particular, for the construction and/or use of a device according to the invention, in which each of the two or more redundant processors is formed for packet-based data processing, in the refinement of the method it is proposed that each redundant safe protocol is built from a number of data packets and the write authorization is allocated for a data packet-wise writing.

The invention also comprises embodiments in which the two or more redundant processors are formed by means of redundant hardware and/or redundant software.

The device according to the invention and the method according to the invention thus also can be used, instead of for single-channel bus coupling of a safety-critical process, also for different width coupling of a safety-critical process from a safe environment having at least two redundant processing channels to a non-safe environment or to a safe environment, which, however, comprises fewer redundant processing channels, and are consequently suitable for essentially any connection between safe processing channels and non-safe transport paths.

A further increase in safety is guaranteed, in turn, when, in an especially preferred construction, before the writing of the common safety-oriented protocol, the redundantly formed safety-oriented protocols through the processing channels are first checked for mutual identity, so that the formation of a common safety-oriented protocol is realized only as a response to identical, independent, safety-oriented protocols processed from an identical input data set. If an error occurs in the redundant processing, this is recognized in due time and the process can be moved into a safe state in due time. The mutually decoupled processors are thus preferably connected to each other, in turn, via a communications interface.

The invention further comprises, in turn, embodiments, in which each write authorization allocated in a defined way to each processing channel is checked for verification by means of a test procedure, for which, e.g., full-content read access is also useful for each register location. For example, in this way, by means of each of the processing channels it can be attempted to write a different, specifically allocated default value into all of the register locations of the buffer register, wherein then each of the processing channels reads all of the register locations of the buffer register and verifies the contents of the register locations for unique interleaving and wherein such a test procedure is preferably performed several times and/or by alternately writing to the register locations and reading from the register locations by means of different processing channels. Essentially each safety transfer/transmission rule set by the coupling of the proportional data to be transmitted to the buffer register at certain positions or addresses within the common safety-oriented protocol or within the buffer register consequently can be easily checked, in turn, and any error in the formation of a safety packet to be transmitted, including due to a loss of processor, can thus be reliably identified. In particular, in order to guarantee the storage and protocol-specific transfer to the bus of the safety-oriented protocol after each protocol-specific processing of the input data into a safety-relevant protocol, wherein the safety-oriented protocol satisfies the requirements based on each application for a safe protocol data set, according to one embodiment each processor comprises an integrated protocol chip. In an alternative construction, the protocol chip can also be connected to a processor on the output side. For avoiding such integrated or output-connected protocol chips and consequently also for reducing components and costs, in another, especially preferred construction it is proposed to provide the processor with software written for processing and protocol-specific transfer of the data.

The device according to the invention can be constructed as a bus subscriber unit, wherein the processors are wired for this purpose preferably on the input side at least with input channels for the single-channel or multiple-channel connection of process-data input units and accordingly for the single-channel or multiple-channel detection of safety-relevant input data to be processed or is constructed as a bus controller, which generates, e.g., the safety-relevant input data to be processed. The processors are thus constructed, in particular, as microcontrollers or as central processing units (CPUs).

The circuit arrangement for connecting the processors or optionally the protocol chips connected downstream from the processors can be constructed as a simple logic circuit, wherein highly integrated circuits, e.g., in the form of an FPGA (Field Programmable Gate Array), can be used and can also be advantageous specific to the application.

The buffer register has an interface, by means of which the common safety-oriented protocol stored there can be coupled with a single channel directly into a bus, e.g., an Interbus, or can be transmitted with a single channel to another device constructed specific to the application, wherein, as another device specific to the application, in particular, another protocol chip, another microcontroller, or some other intelligent unit can be used.

As a buffer register, a standard RAM is adequate. In a preferred refinement, however, it is provided to construct the buffer register or the buffer memory in the form of a dual-port memory (DPM), so that the processors can be connected in the simplest and most economical way by means of one of the two interface ports and the additional single-channel coupling can be performed by means of the second interface port.

BRIEF DESCRIPTION OF THE DRAWINGS

Additional features and advantages of the invention are visible from the following detailed description of a preferred, but merely example embodiments of the invention with reference to the enclosed drawings.

Shown in the drawings are.

DETAILED DESCRIPTION

Figure 1:
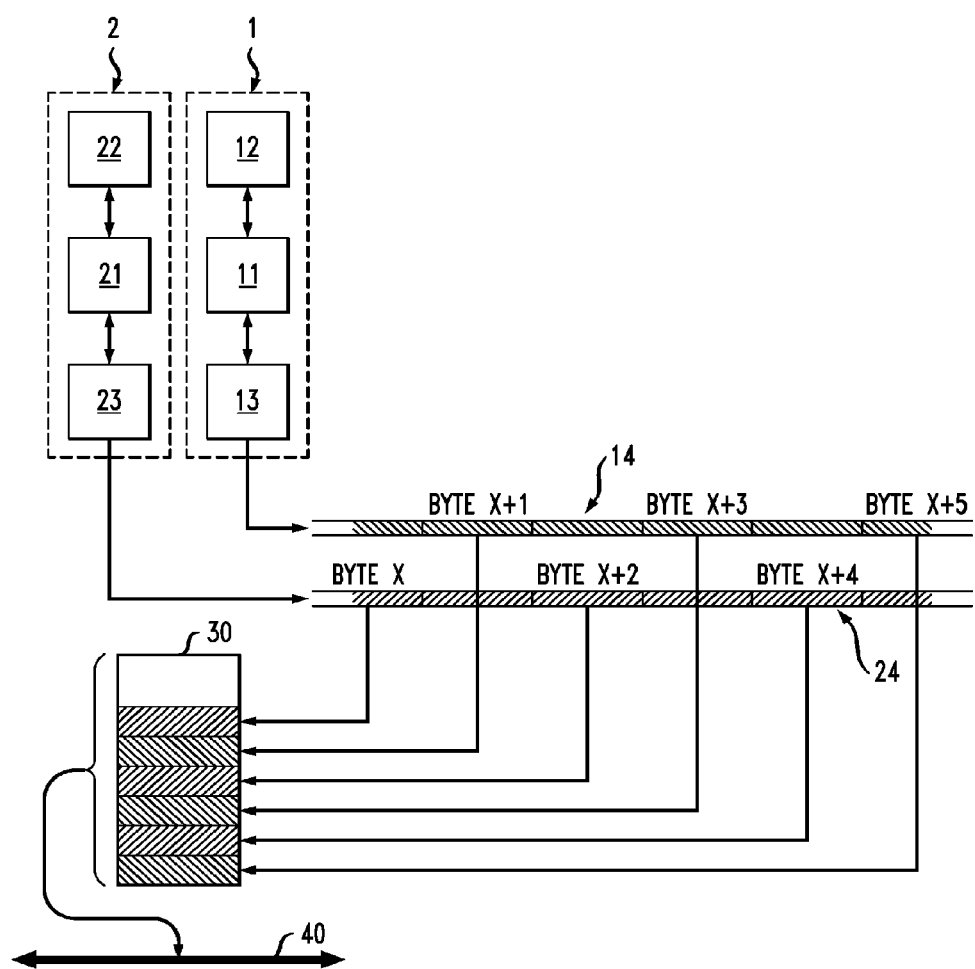
FIG. 1 is a schematic block diagram for the redundant formation of safety-oriented protocols for a safety packet to be transmitted by means of redundant processing channels and subsequent common formation of an identical, safety-oriented protocol under the control of a transmission/transfer rule concerning each portion to be transmitted/transferred from the safety-oriented protocols according to the German Patent Application No. 10 2004 039 932.8.

In FIG. 1, two redundant processing channels 1 and 2 are shown of a bus subscriber unit or bus controller not shown in more detail for coupling a safety-critical process to a bus 40, e.g., an Interbus. In the case of a bus subscriber unit, each of the processing channels is connected to similarly not-shown input/output units, e.g., sensors and/or actuators, allocated to the safety-critical process.

According to the specific connection of a single channel or double channel for the processing channels 1 and 2, identical input data that is relevant for the safety-critical process is made available to a bus subscriber unit with a sensor-side application and preferably first stored in memory 12 or 22 for further processing. In particular, in the case of a bus controller, safety-relevant input data to be prepared into safe data before bus transmission is located in memories 12 or 22.

The input data are first processed before the transmission of a safety packet via the bus 40 redundantly under the use of the same laws for each safety-oriented protocol 14 and 24. The processing channels here comprise a microcontroller 11 or 21 each for preparation/processing of the safety-relevant input data located in memory 12 or 22 into a safety-oriented protocol 14 or 24, as well as in the construction according to FIG. 1, a protocol chip 13 or 23 each, which is connected after the microcontroller 11 or 21 and which receives the safety-oriented protocol 14 or 24 calculated by each microcontroller 11 or 21 for further transmission to the bus 40. In an alternative construction to the shown protocol chip 13 or 23, the microcontrollers 11 and 21 can also comprise corresponding software, so that the additional transfer described below of the calculated protocols 14 and 24 to the bus 40 is performed by the microcontrollers 11 and 21.

The calculated, safe or safety-oriented protocols 14 and 24 are thus identical, as long as no errors or losses occur in the calculation. It should be noted that the safe protocols are here obviously set up so that these satisfy the requirements of the standard for safety-oriented transmission.

For an additional increase in safety, before the transmission of a safe packet via the bus 40, the common formation of another identical, common safety-oriented protocol is provided, which can then be transferred with a single channel to the bus 40 for transmission.

This common, safety-oriented protocol is formed by a proportional assembly of data of the safe protocol 14 and of data of the safe protocol 24 in a buffer memory or buffer register 30, which can be accessed by each of the processing channels 1 and 2.

To prevent that this safety-oriented protocol form in common is based merely on data from only one of the processing channels 1 or 2, which would be equivalent to the transmission of a safety packet by only one of the microcontrollers 11 or 21, e.g., due to the loss of one of the two microcontrollers, a defined or definable access rule controls the write permissions to the buffer memory 30. The access rule defines that, from each processing channel 1 and 2, only the parts of each calculated safety-oriented protocol for the formation of the common safety-oriented protocol can be written into the corresponding memory locations of the buffer memory 30, for which each microcontroller 11 or 21 has the corresponding write authorization. Therefore, for each memory or register location, according to the invention only one write authorization is defined.

Starting from the assumption that the safe protocols 14 and 24 are identical, each of the protocols thus comprises the same number of bytes, designated in FIG. 1 with Byte X to Byte X+5. In the present example according to FIG. 1, for the microcontroller 21 of the processing channel 2, the write authorization for the memory addresses of the buffer memory 30 for the byte X, the byte X+2, and also for the byte X+4 has a fixed allocation and for the microcontroller 11 of the processing channel 1, the write authorization is allocated for recording the byte X+1, the byte X+3, and the byte X+5. Consequently, only one write authorization for recording every second byte into the buffer memory 30 is allocated for each of the microcontrollers 11 and 21.

For example, if X=0 and if the redundant, safety-oriented protocols 14 and 24, as well as the identical safety-oriented protocol to be formed in common, that is the safety packet to be subsequently transmitted, is made from a total of 6 bytes, the data within the redundant safe protocols and thus also within the safety packet to be transmitted is assembled from a header of 2 bits, ten useful data of 14 bits, an address of 8 bits, and a CRC checksum of 24 bits. With the above, defined allocation write access authorization, the header comprising 2 bits and the first 6 bits of the useful data are consequently imported with reference to FIG. 1 from the safe protocol 24 calculated by means of the processing channel 2, the next 8 bits of useful data are imported from protocol 14 calculated by means of the processing channel 1, the address comprising 8 bits is imported, in turn, from the protocol data set 24, and the CRC checksum comprising 24 bits is imported in portions one after the other from the calculated protocols 14, 24, and 14.

A standard RAM or preferably, as described below, a standard DPM can be used as the buffer memory.

Even for only double redundancy, even higher safety is achieved if, in addition, preferably the microcontrollers 11 and 21 of both processing channels 1 and 2 are allocated complete read access to the buffer memory 30.

This allows a simple comparison of the entire data, in that, it can be easily checked whether the safe protocol formed in common and to be transmitted as a safety packet, which, for example, satisfies the safety requirements for a simple transmission according to SIL 3 IEC 61508, is error free, that is, through corresponding verification relative to the individual, safety-oriented protocols 14 or 24 formed separately in advance. In addition, the full-content read access for each of the processing channels 1 and 2 allows, for each of the processing channels 1 and 2, the check whether the access rule has been performed generally error-free, which can be performed already in advance of the control/monitoring/regulation of a safety-critical process. For this purpose, it is checked, in particular, whether the calculated data of each microcontroller of one and the other processing channel has been written only, which, however, is guaranteed, in the correspondingly allocated memory addresses of the buffer memory 30.

If this "self-verification" and/or "cross-verification" leads to an unequal result, errors are necessarily identified and a safety-oriented function is initiated.

Figure 2:
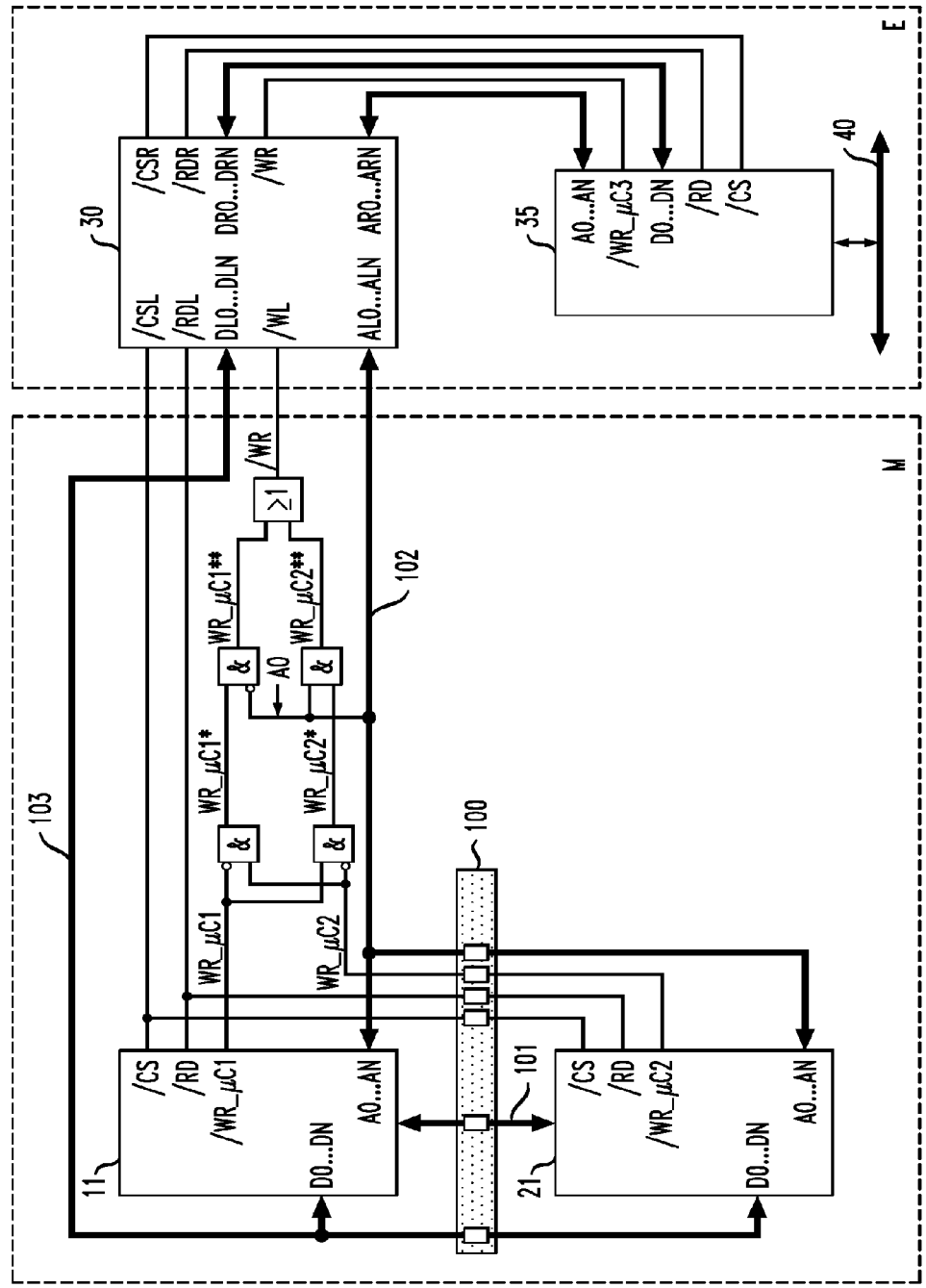
FIG. 2 is one possible functional circuit diagram of a conversion of the invention, based on two microcontrollers according to the German Patent Application No. 10 2004 039 932.8 each redundantly calculating the complete, safety-oriented protocol.
Figure 3:
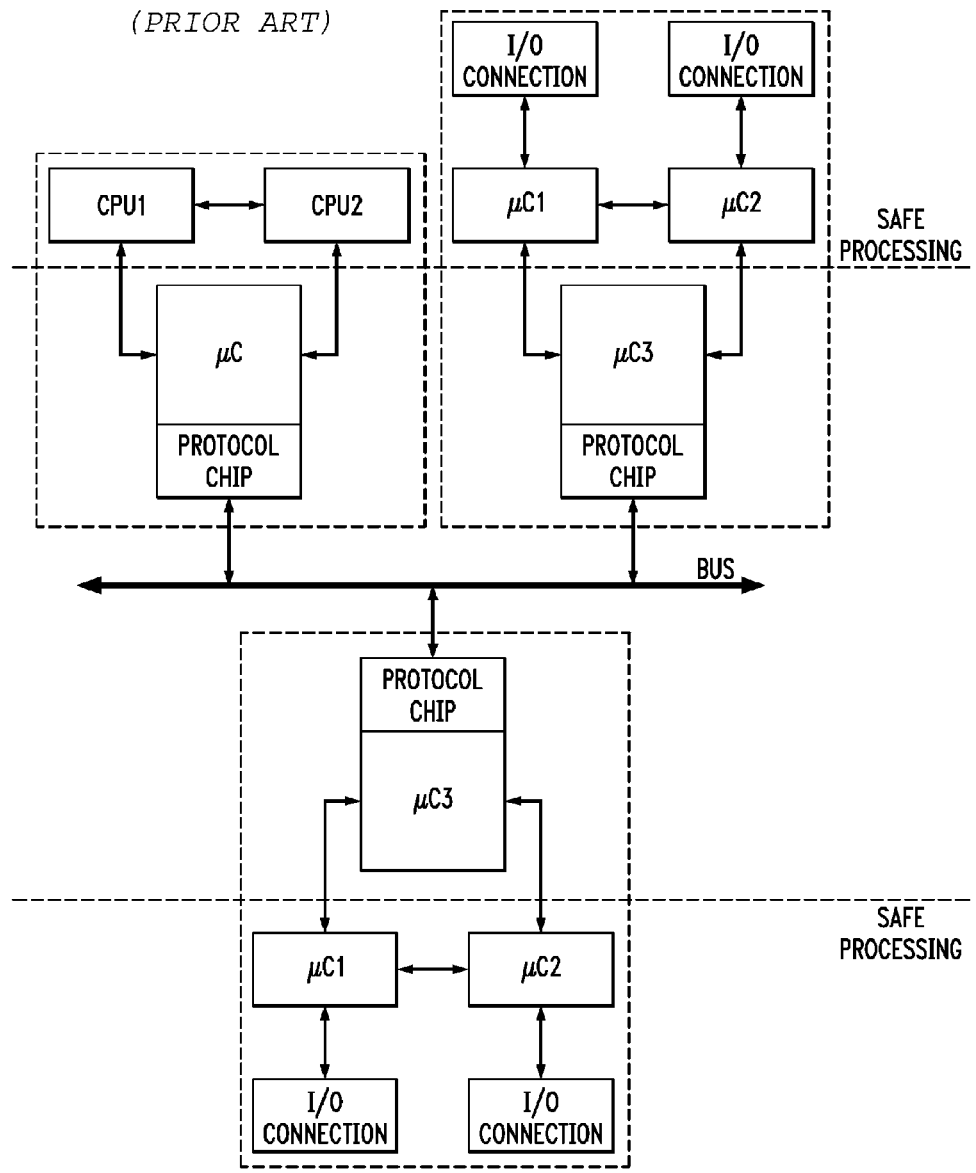
FIGS. 3 and 4 are other known realizations for the transfer from the double-channel structure to the single-channel structure.
Figure 4:
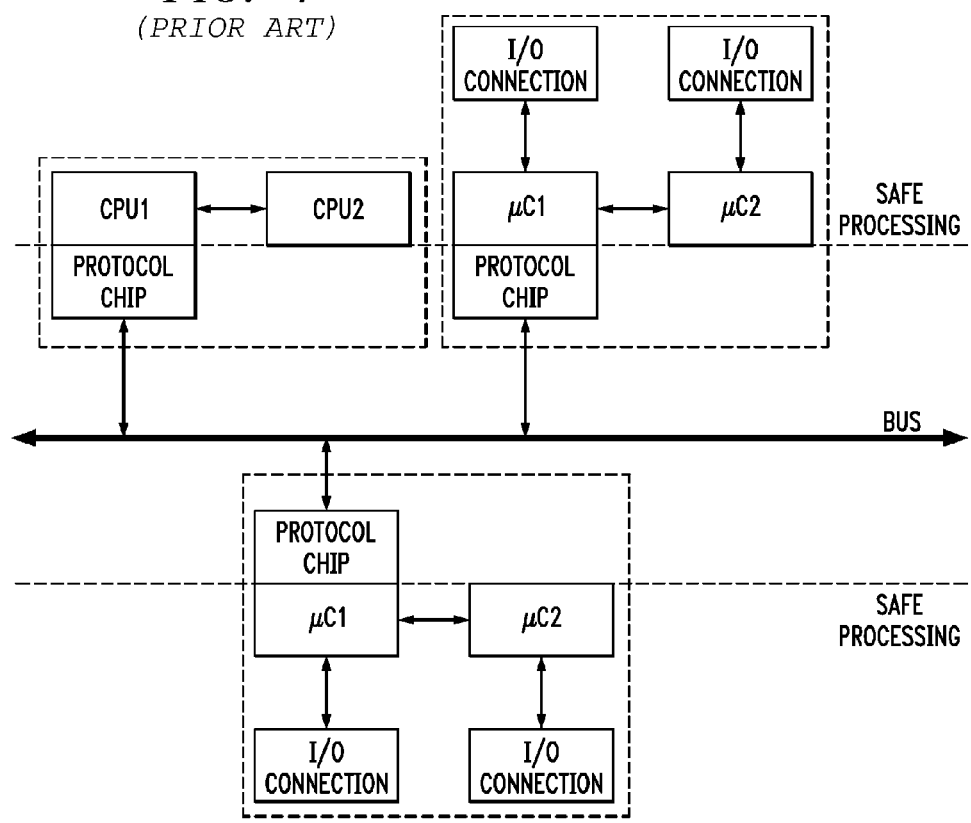

As an example, FIG. 2 presents one possible function circuit diagram which uses, however, software written in advance instead of protocol chips, for conversion of the write authorization sketched in FIG. 1, as well as the full-content read authorization as a basis for this verification.

As shown in FIG. 2, the region designated with M and shown on the left comprises the multiple-channel architecture according to the invention with safety analysis and the right region designated with E in FIG. 2 comprises the single-channel architecture with the safety-oriented protocol formed in common and to be transmitted as the safety packet.

Thus, essentially based on FIG. 1, the two microprocessors 11 and 21 are decoupled in a known way, characterized in FIG. 2 with the reference symbol 100, and further connected to each other by means of a communications interface 101 for the additional, mutual checking of each separately calculated safety-oriented protocols 14 and 24.

The address bus 102 for the addresses Ax, with x between 0 and N, the data bus 103 for the data Dx, with x between 0 and N, and also the signals /CS (chip select) and /RD (read) are applied, in a normal way, directly to the standard DPM shown in FIG. 2 and to the corresponding pins for the signals /CSL or /RDL. The address line A0 is linked with the write signals /WR_µC1 and /WR_µC2 of the microcontrollers 11 and 21 in such a way that for direct addresses, only the microcontroller 11 is write authorized and for indirect addresses, only the microcontroller 21 is write authorized. Only in these two cases can the write signal /WR be initiated via the corresponding pin for the "low active" signal /WL on the RAM of the standard DPM. However, both microcontrollers 11 and 21 can access the entire memory 30 for reading.

A check of the access lock that can be performed before the writing of the safety packet to be formed in common is performed, for example, with the following sequence:

The microcontroller 11 attempts to write a default value, e.g., FFh, into all of the memory locations of DPM 30.

The microcontroller 21 then attempts to write a different default value, e.g., 00h, into all of the memory locations of DPM 30.

The microcontroller 11 then reads all of the memory locations of DPM 30 and checks whether the value 00h is recorded only in the memory locations allocated to the microcontroller 21 and optionally whether the value FFh is recorded in the memory locations allocated to the microcontroller 11. Then the microcontroller 11 again attempts to write the value FFh into all of the memory locations.

Then the microcontroller 21 reads all of the memory locations of DPM 30 and checks whether the value FFh is recorded only in the memory locations allocated to the microcontroller 11 and optionally whether the value 00h is recorded in the memory locations allocated to the microcontroller 21.

If an error occurs during this expected behavior, then the error is identified and a safety-oriented function is initiated, e.g., the process is changed to a safe state. Otherwise it can be assumed that the access locking is working without a problem. One essential feature in the realization according to the invention is thus that the actual write signals of each microcontroller 11 or 21 are not used directly, but instead a logic function is performed on the addresses. Thus, only the addresses allocated to each microcontroller can be written.

The data stored in the RAM of DPM 30 is consequently safe by means of a very highly safe protocol. The DPM 30 is not considered safe, just like the transmission channel itself. Safety is achieved, among other things, in that, on the processing side, that is, in the area designed with M in FIG. 2, there is an expected behavior in the configuration or contents of the data. Consequently, the additional processing or distribution of the data buffered in the DPM 30 can be transmitted, for example, by means of another microcontroller 35, which imports the data from the DPM 30 using a single channel, for example, through coupling in a field bus 40.

By performing a self-verification, both microcontrollers 11 and 21 can monitor each access rule practically automatically during the writing of the safety packet into the buffer memory 30 and the data stored in the memory can be transmitted using a single channel by means of an interface of the buffer memory 30 for transmission to a protocol chip, another microcontroller, or some other intelligent unit. Because a complete safety packet can no longer be generated if there is a loss of or an error in one of the microcontrollers 11 or 21, errors are definitely detected and a safety-oriented function is initiated. The safety analysis of the redundant architecture M thus ends, in principle, with the storage of the data on the memory 30, because the safety mechanism of the protocol engages starting from here and because possible errors starting from here are considered for transmission just like before and must be corrected. An error to be considered here from the basic principles for the testing and certification of "bus systems for the transmission of safety-relevant messages" is message corruption.

Due to the unconditional linking of the write authorization described above with the positions to be written in the safe protocol to be formed in common and the unrestricted read authorization of both microcontrollers, the comparison or the verification of the safety packet to be transmitted before the actual transmission via a bus 40 is guaranteed through the use of standard components. Consequently, a microcontroller 11 or 21 is in the position by itself to transmit a safety packet.

The functional circuit diagram shown in FIG. 2 thus already can be realized by a simple logic circuit, but can also be realized, for example, by an FPGA. Furthermore, instead of the DPM 30 shown in FIG. 2, a standard RAM can also be used. Due to the DPM that is used, however, the circuit is simplified with respect to the reading of the safety packet from the buffer memory. For those skilled in the art, it is obvious that the circuit arrangement shown in FIG. 2 represents only one of the possible technical realizations for a unique write access authorization. The data lines can also be divided, e.g., so that one processor can write access only the upper data lines and a redundant processor can write access only the lower data lines of the buffer memory. A write access rule according to the invention can be further used for more than only two redundant processor/processing channels.

Figure 5:
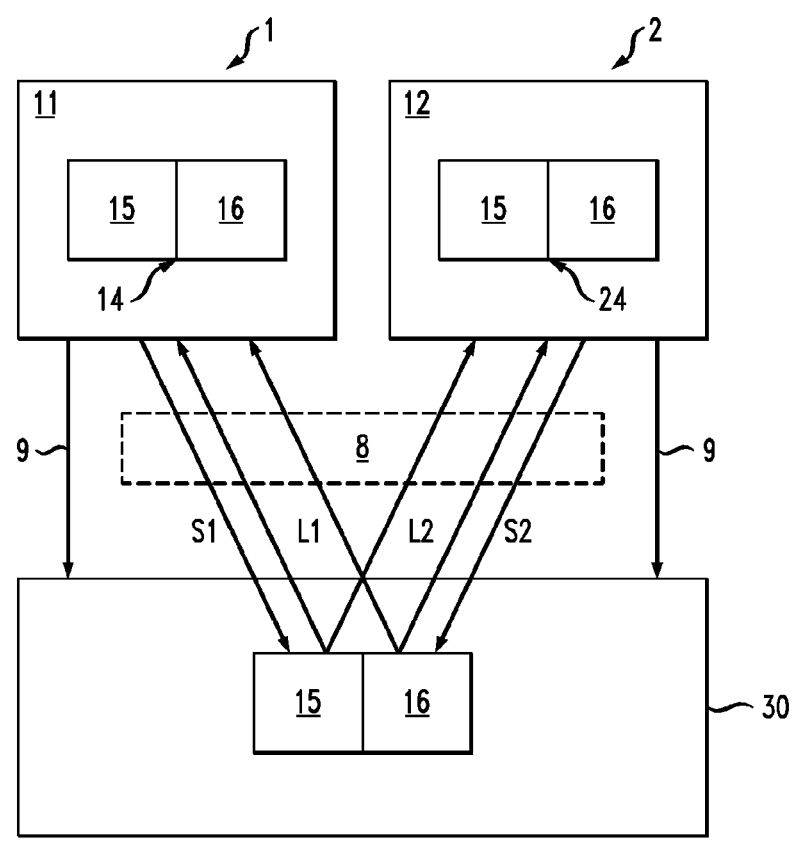
FIG. 5 is a block diagram of a preferred embodiment of the present invention built on FIGS. 1 and 2 concerning the coupling from a safe environment having several redundant processing channels of a safety-oriented protocol, which is built from a number of data packets corresponding to the number of processing channels, in a data area used as the buffer register and arranged in a non-safe environment or in a safe environment, which, however, comprises fewer processing channels.

Now, in FIG. 5, in a kind of schematic diagram, a preferred embodiment of the present invention is shown, in which only after the complete and positive execution of a self-verification of a safety packet read from a data memory 30, this is released for further transmission.

In FIG. 5, in turn, two processing channels 1 and 2 are sketched, which are part of a safe system and which can be configured specific to the application by means of multiple-channel hardware or several software processes or a combination of these, which produces, in the overall configuration, safety essentially corresponding to the required safety described above for guaranteeing safety-specific requirements. Such a safe system thus comprises, in turn, at least two redundant, safe processing channels 1, 2 for generating safe protocols allocated to at least one safety-critical process, in order to obtain correspondingly higher safety.

The processing channels 1 and 2 or processors 11, 21 comprised therein and also based on different hardware or also on different software on common hardware are further constructed in the present embodiment for packet-oriented data processing.

According to FIG. 5, each safe processing channel 1 and 2 creates, in turn, a complete and identical safe protocol 14 or 24. Due to the construction for packet-oriented data processing, however, each safe protocol 14 and 24 is constructed from a number of data packets 15 and 16. The number of data packets 15 and 16 further corresponds in the present embodiment to the number of safe processing channels 1 and 2, so that each safe protocol 14 and 24 is made from two data packets 15 and 16.

The safe processing channels 1 and 2 can be connected to each other optionally, in turn, by means of a communications interface 101, e.g., in order to compare the created safe protocols 14 and 24 with each other, before each data packet or protocol part 15 and 16 is released for further processing, i.e., for writing in the data memory 30. Such a comparison, however, is not absolutely necessary at this point.

The access authorizations for the processing channels 1 and 2 to the data memory 30 for reading and writing data are controlled, in turn, in a suitably defined way, for example, by access locking indicated in FIG. 5 with the reference symbol 8 by means of hardware. Based on the construction of the processing channels 1 and 2 for packet-oriented data processing, the write authorizations are allocated in the embodiment according to FIG. 5 in such a way that packet-wise writing of data into the data memory 30 is enabled.

To guarantee that a different data packet is written into the data memory 30 by each processing channel 1 and 2, e.g., the access permission can be such that the processing channel 1 can write access only memory locations of a first congruent memory area and the redundant processing channel 2 can write access only memory locations of a different congruent memory area of the data memory 30.

In FIG. 5, the write permissions and read permissions for the processing channel 1 are indicated by the arrows characterized with "S1" or "L1" and the write permissions and read permissions for the processing channel 2 are indicated by the arrows characterized with "S2" or "L2." Accordingly, the processing channel 1 can write only the data packet 15 into the common data memory 30 and the processing channel 2 can write the data packet 16 into the common data memory 30. Both processing channels 1 and 2, however, are authorized to read both data packets 15 and 16 from the data memory 30.

Consequently, each safe, redundant processing channel 1 and 2 presents a different part of each generated, safe protocol 14 or 24 into the common data area 30, in turn, in order to assemble a safe protocol there in common.

Because the processing channel 1 wrote the data packet 15 of the protocol 14 and the processing channel 2 wrote the data packet 16 of the protocol 24 into the common data memory 30 each as a part of the protocol, the safe redundant processing channels 1 and 2 read the complete data back from the data memory 30 and compare this with the internally released, safe protocol or data set 14 or 24. If a corresponding comparison finds that the read data are identical to the internally released data set, the processing channel 1 or 2 releases the safe protocol formed in common in the data memory 30 by means of correspondingly suitable means and/or measures, such as, for example, by means of a release signal 9 for further processing. Only when each redundant processing channel 1 and 2 has released the safe protocol formed in common in data memory 30 for further processing, is this effectively released for transfer/transmission from the data memory 30. For example, in order to allow or release access to the buffer register contents for its transfer or transmission for further processing only in the presence of a release by each of the redundant processing channels, the activation of a release signal or enable signal releasing a corresponding output of the contents can be realized by means of AND gating of the individual release signals in the presence of a release by each redundant processing channel 1, 2.

The additional transport of the protocol formed in common after transmission/transfer from the data memory 30 can be arbitrary, for example, according to the preceding description with reference to FIGS. 1 and 2, and is essentially dependent exclusively on the measures, which were integrated in the safe protocol.

The embodiment described according to FIG. 5 is thus suitable not only for single-channel bus coupling of a safety-critical process, but also for a different width coupling of the safety-critical process from a safe environment having at least two redundant processing channels to a non-safe environment or a safe environment that has, however, fewer channels, without compromising safety. The coupling mechanism described above thus can be used preferably for any connection between safe processing units via non-safe transport paths. This applies for the transport of data by means of networks, such as, e.g., Interbus or Ethernet, or within devices, including those that can be configured by expansion units, for example, inline stations.

It should be noted that, in principle, data could also be imported in the same way into a safe process environment with several processing channels from a non-safe or a safe environment that has, however, fewer processing channels.

The invention claimed is:

1. A method for single-channel bus coupling of a safety-critical process, the method comprising:
   processing a data set relevant for the safety-critical process by means of at least a first redundant processing channel and a second redundant processing channel according to identical laws for a safe protocol, wherein the first redundant processing channel forms a first redundant safe protocol and the second redundant processing channel forms a second redundant safe protocol; and
   assembling the redundant safe protocols into an additional identical common safe protocol, in that a common buffer register is accessed by each of the first and second processing channels, wherein, for each register location in the common buffer register, a write authorization is allocated only once, such that the additional identical common safe protocol is assembled proportionally by writing different portions of each of the first and second redundant safe protocol, wherein, before a transmission of the additional identical common safe protocol from the common buffer register, for verification of the additional identical common safe protocol, the contents of each register location of the common buffer register are read by each of the first and second redundant processing channel, characterized in that the additional identical common safe protocol is released only as a reaction to a release by each of the first and second redundant processing channel for the transfer or transmission from the buffer register for further processing.

2. Method according to claim 1, wherein the release by the first processing channel is realized (1) by transmitting a release signal from the first processing channel to the buffer register, and wherein the release by the second processing channel (2) is realized by transmitting a release signal from the second processing channel to the buffer register.

3. Method according to claim 1, characterized in that each of the redundant safe protocols (14, 24) is built from a number of protocol parts corresponding to the number of the at least first and second redundant processing channels (1, 2) and a different protocol part is written into the buffer register for assembling the common safe protocol from each processing channel.

4. Method according to claim 1, in which each redundant safe protocol (14, 24) is built from a number of data packets and the write authorization is allocated for data packet-wise writing.

5. Method for different width coupling of a safety-critical process from a safe environment having at least a first and a second redundant processing channel to a non-safe environment or to a safe environment, which, however, comprises fewer redundant processing channels, comprising utilizing the method according to claim 1.

6. Method according to claim 2, wherein the activation of an enable signal is generated for the presence of a release by each of the first and second redundant processing channels (1, 2) by means of AND gating of the individual release signals.

7. Method for connecting between safe processing channels by means of non-safe transport paths, comprising utilizing the method according to claim 5.

8. A device for single-channel bus coupling of a safety-critical process, comprising:

at least a first redundant processor and a second redundant processor for processing an identical input data set under use of identical laws for each safe protocol, wherein the first redundant processing channel forms a first redundant safe protocol and the second redundant processing channel forms a second redundant safe protocol; and a circuit arrangement for connecting each of the first and second redundant processors to a common buffer register in such a way that for each register location of the buffer register;

a) a write access capability is given to only one of the first and second redundant processors for assembling the additional identical common safe protocol proportionally by writing different portions of each of the first and second redundant safe protocol; and b) a read access capability is given to each of the first and second redundant processors, and wherein the circuit arrangement is characterized in that each of the first and second redundant processors comprises means for verifying contents read from the buffer register and for releasing the contents of the buffer register in response to a positive verification result.

9. Device according to claim 8, further characterized in that each of the at least first and second redundant processors (11, 21) is constructed for packet-based data processing.

10. Device according to claim 8, wherein the at least first and second redundant processors are formed by means of redundant hardware and/or redundant software.

11. Method for different width coupling of a safety-critical process from a safe environment having at least a first and a second redundant processing channels to a non-safe environment or to a safe environment, which, however, has fewer redundant processing channels, comprising utilizing the device of claim 8.

* * * * *